US006766966B2

(12) United States Patent
You

(10) Patent No.: US 6,766,966 B2
(45) Date of Patent: *Jul. 27, 2004

(54) PORTABLE SPRAY CAR WASH DEVICE

(75) Inventor: Jung You, Alpharetta, GA (US)

(73) Assignee: Evergreen Works, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/357,064

(22) Filed: Feb. 3, 2003

(65) Prior Publication Data

US 2003/0116646 A1 Jun. 26, 2003

Related U.S. Application Data

(63) Continuation-in-part of application No. 10/166,486, filed on Jun. 10, 2002, now Pat. No. 6,595,438, which is a continuation-in-part of application No. 09/775,031, filed on Feb. 1, 2001, now Pat. No. 6,446,881.

(51) Int. Cl.[7] .............................................. B05B 9/03
(52) U.S. Cl. ..................... 239/146; 239/149; 239/722; 222/175; 222/626
(58) Field of Search ................................ 239/146, 147, 239/148, 149, 722, 546, 289, 401; 222/626, 175, 401

(56) References Cited

U.S. PATENT DOCUMENTS 3,380,658 A * 4/1968 Stasz et al. ................. 239/146
3,680,786 A    8/1972 Levy ........................... 239/146
3,692,243 A * 9/1972 Breunsbach ................. 239/401
3,797,744 A    3/1974 Smith .......................... 239/172
3,831,849 A    8/1974 Studinger
4,059,123 A   11/1977 Bartos et al.
4,071,195 A * 1/1978 Kuhns et al. ................ 239/289
4,089,446 A    5/1978 Logan, II et al. ........... 222/626
4,204,328 A * 5/1980 Kutner ........................ 239/546
4,546,903 A   10/1985 Burch
4,638,945 A * 1/1987 Toda et al. .................. 239/143
4,821,958 A    4/1989 Shaffer
4,967,960 A   11/1990 Futrell ......................... 239/148
5,029,758 A    7/1991 Chayer ........................ 239/146
5,064,123 A   11/1991 Aiello et al. ................ 239/146
5,387,200 A    2/1995 Kronstadt
5,421,900 A    6/1995 Clontz
5,816,499 A   10/1998 Christiansen
6,241,135 B1   6/2001 Thatcher

FOREIGN PATENT DOCUMENTS

GB           2074048 A     10/1981    ............. B05B/9/03

* cited by examiner

Primary Examiner—Thomas Denion
Assistant Examiner—Thai Ba Trieu
(74) Attorney, Agent, or Firm—Myers & Kaplan, LLC; Barry E. Kaplan; Ash D. Patel

(57) ABSTRACT

A portable, battery powered spray applicator car wash device capable of holding and dispensing liquid cleansers and waxes for rubbing into the body and windows of a vehicle; thereby, enabling complete and portable mobile washing and cleaning services and complete detailing of a vehicle without the use of water.

19 Claims, 14 Drawing Sheets

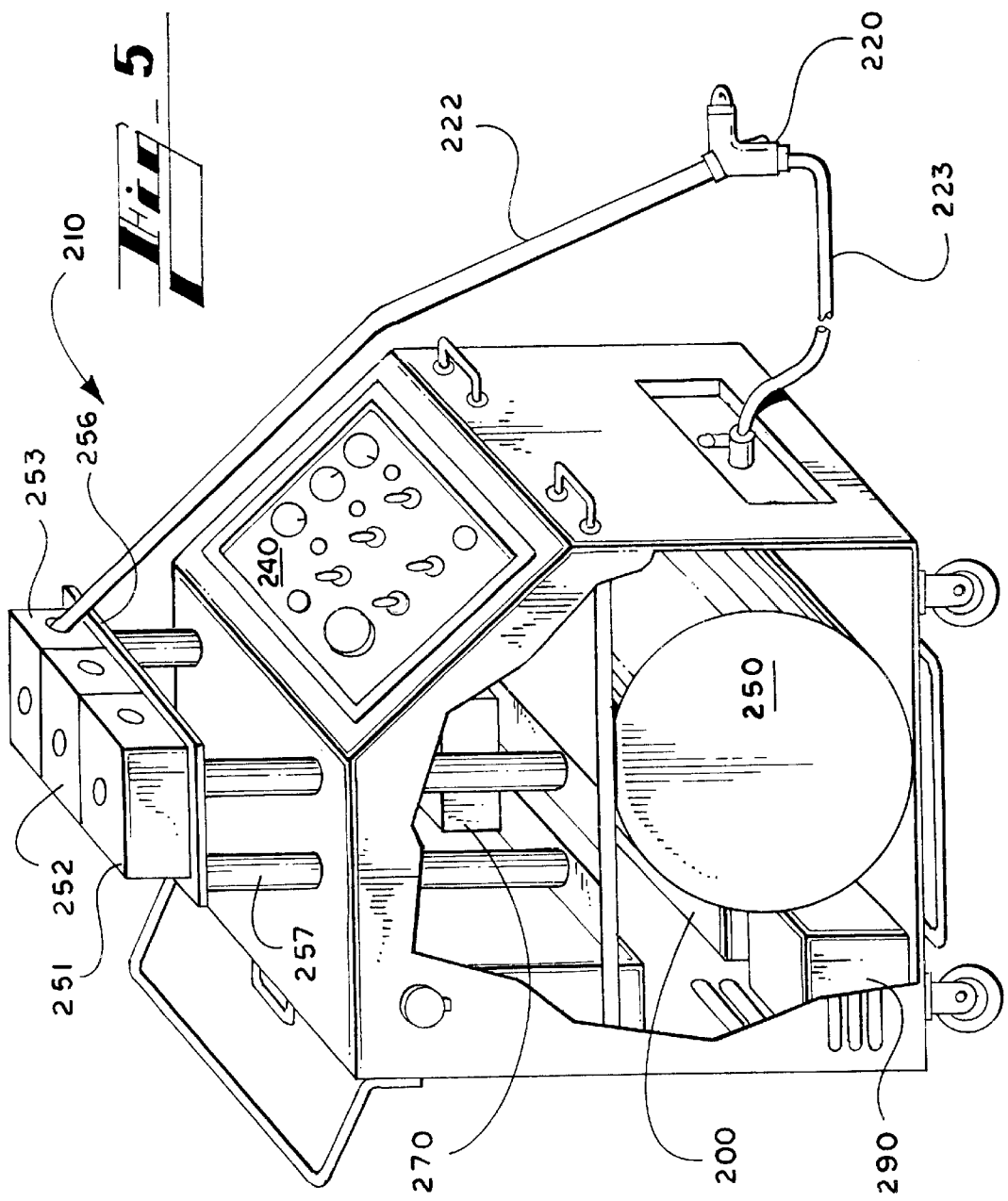

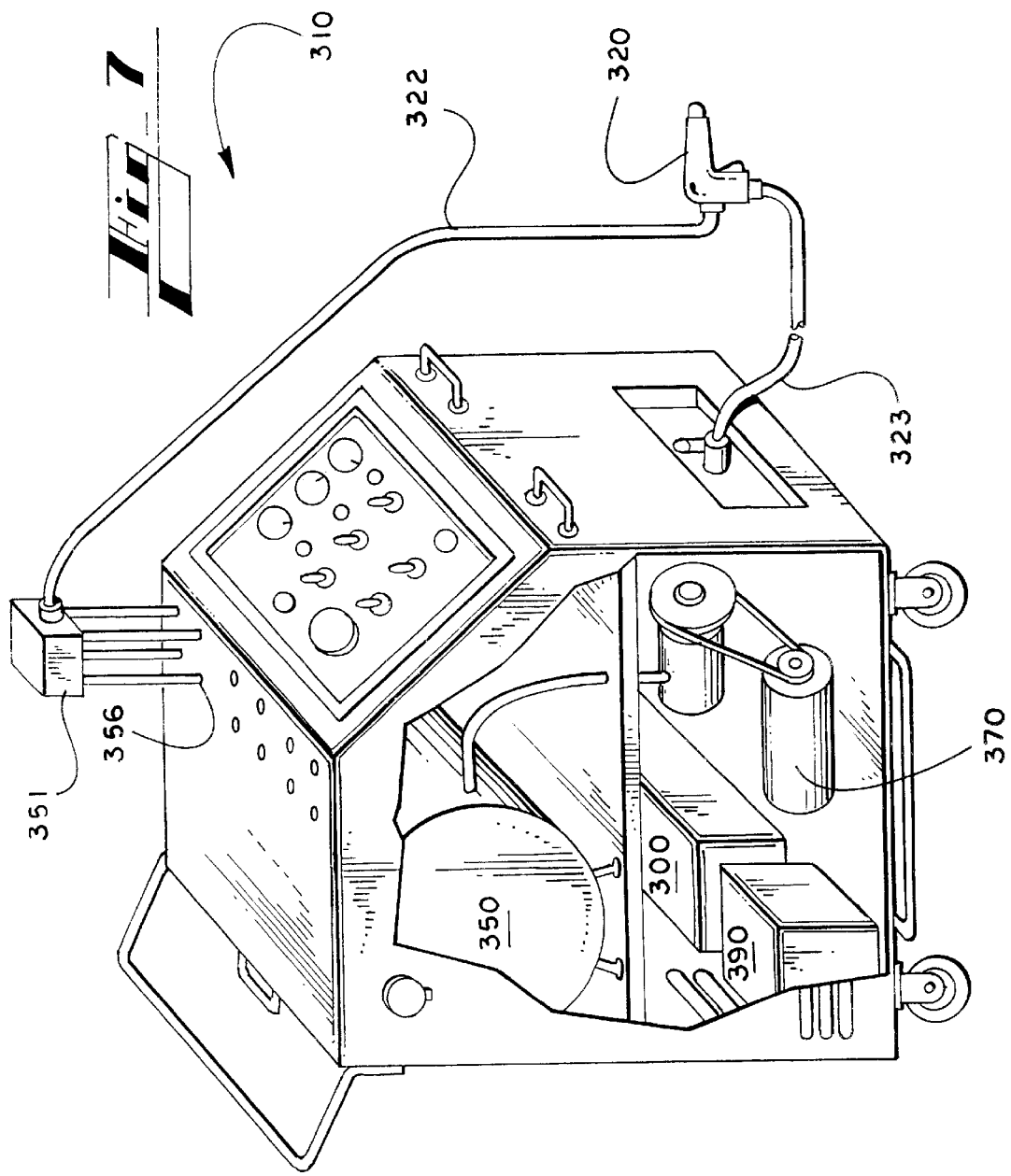

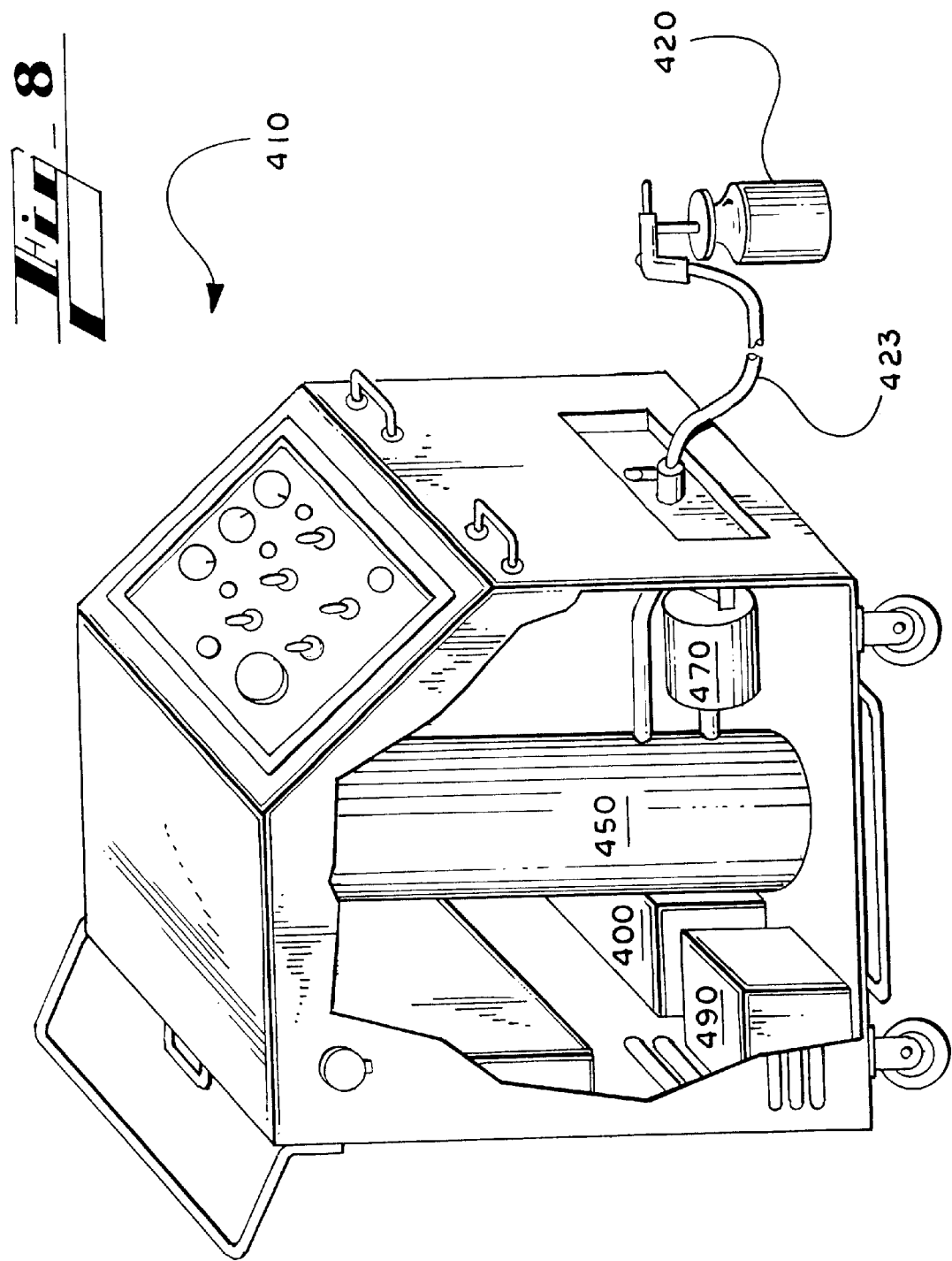

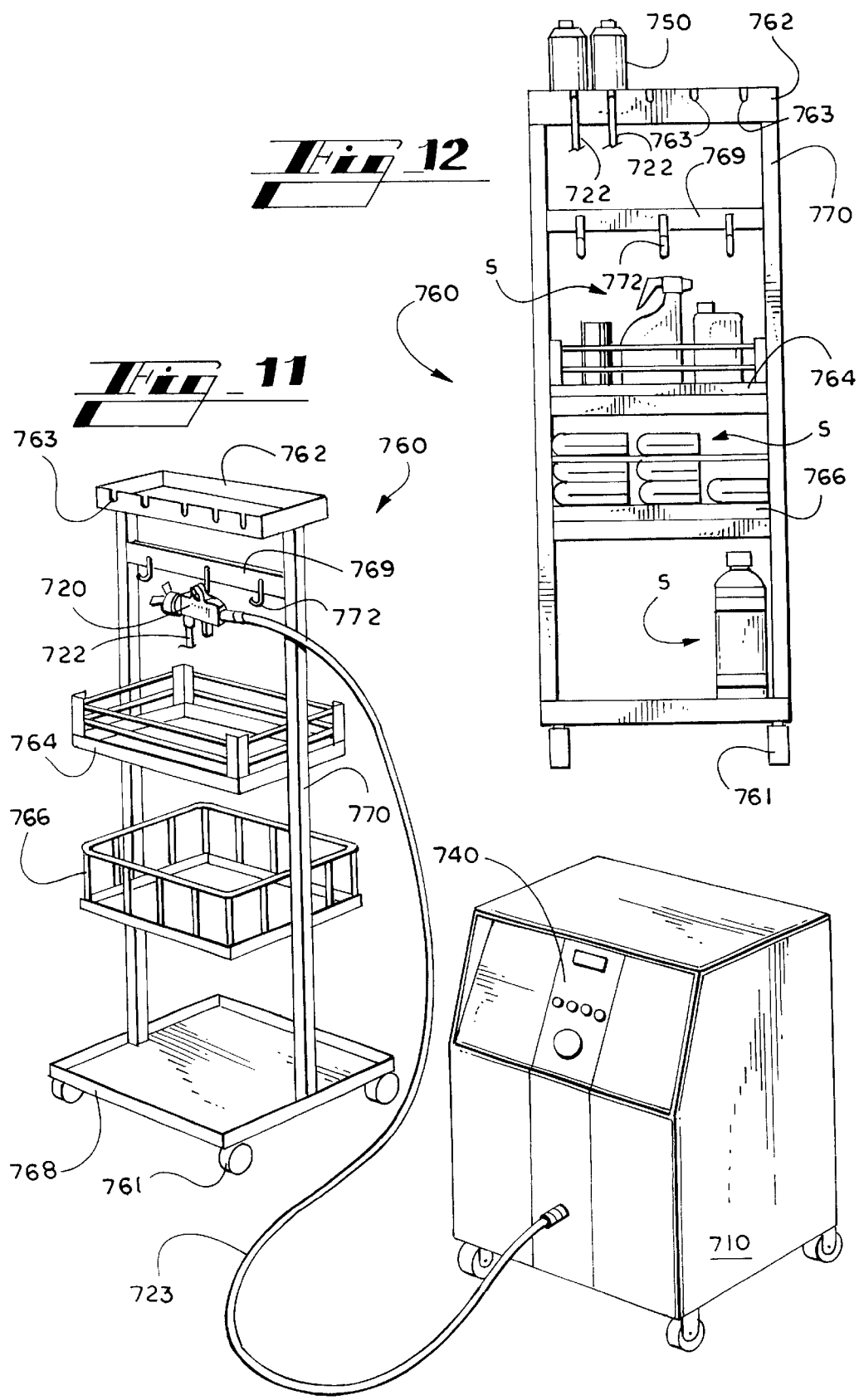

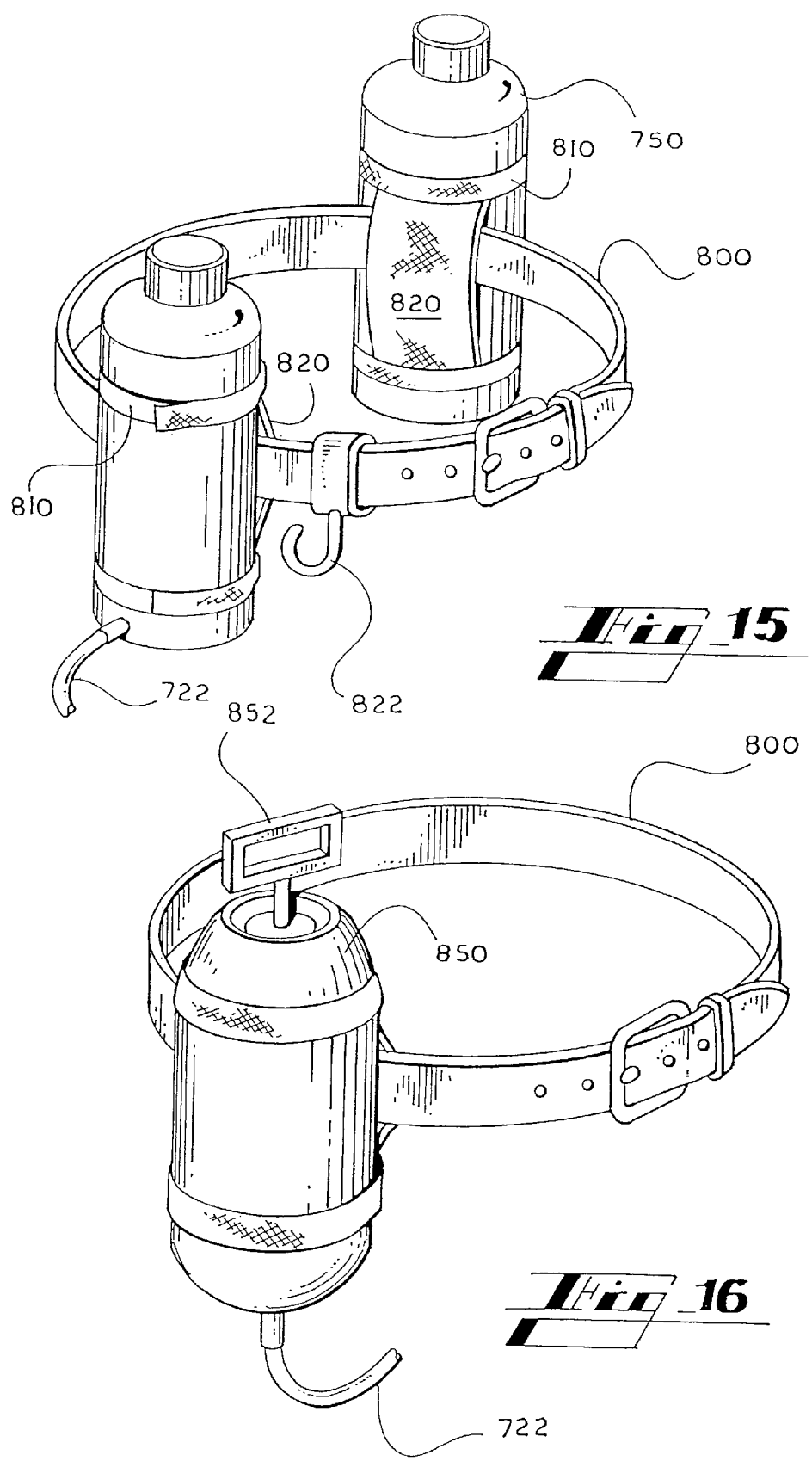

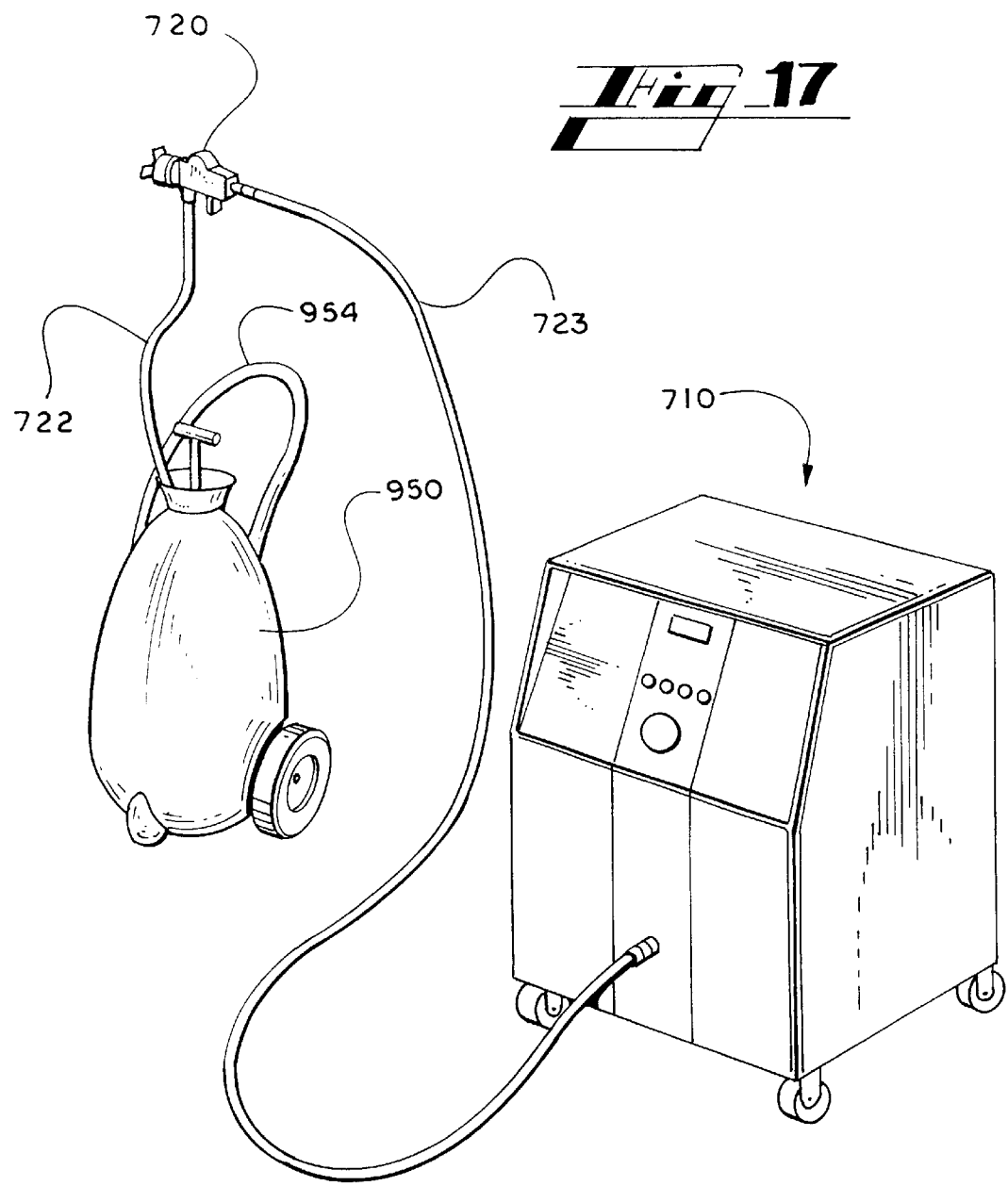

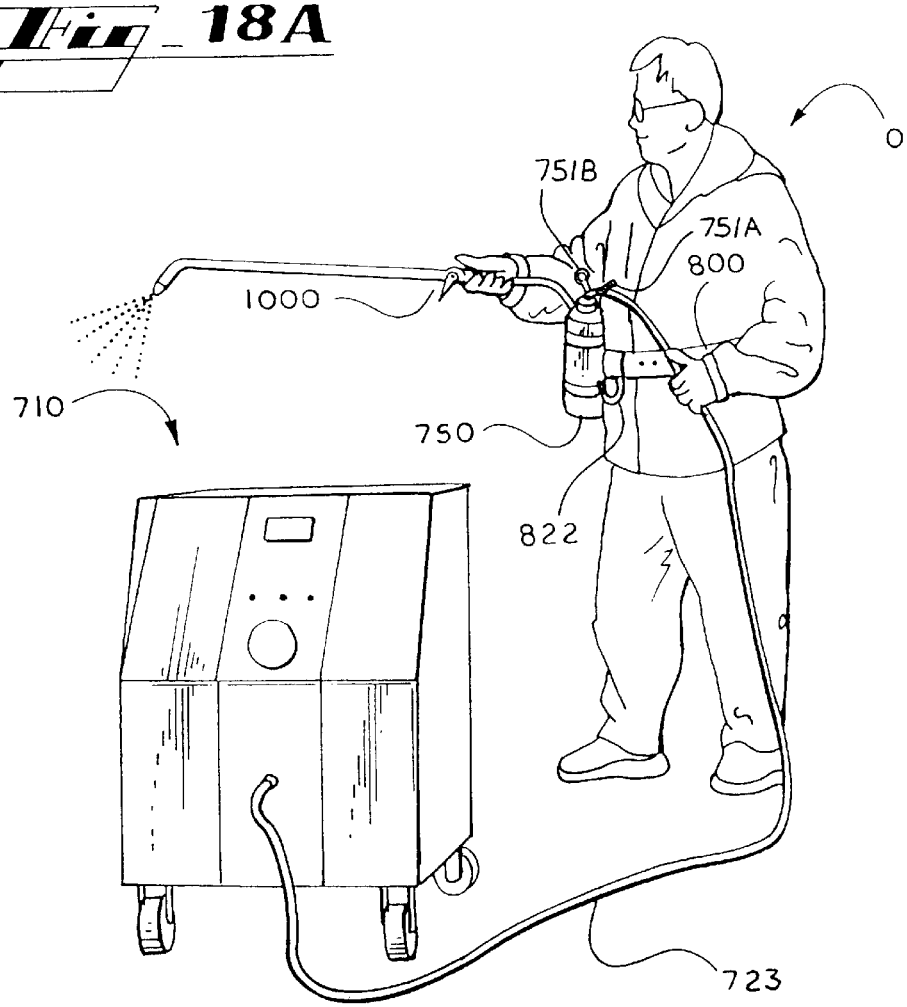
Fig_18A
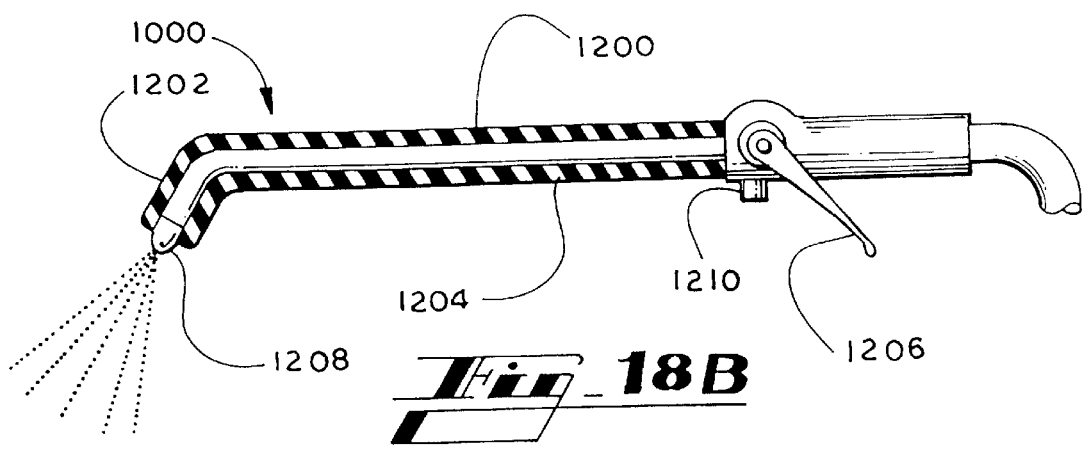
Fig_18B

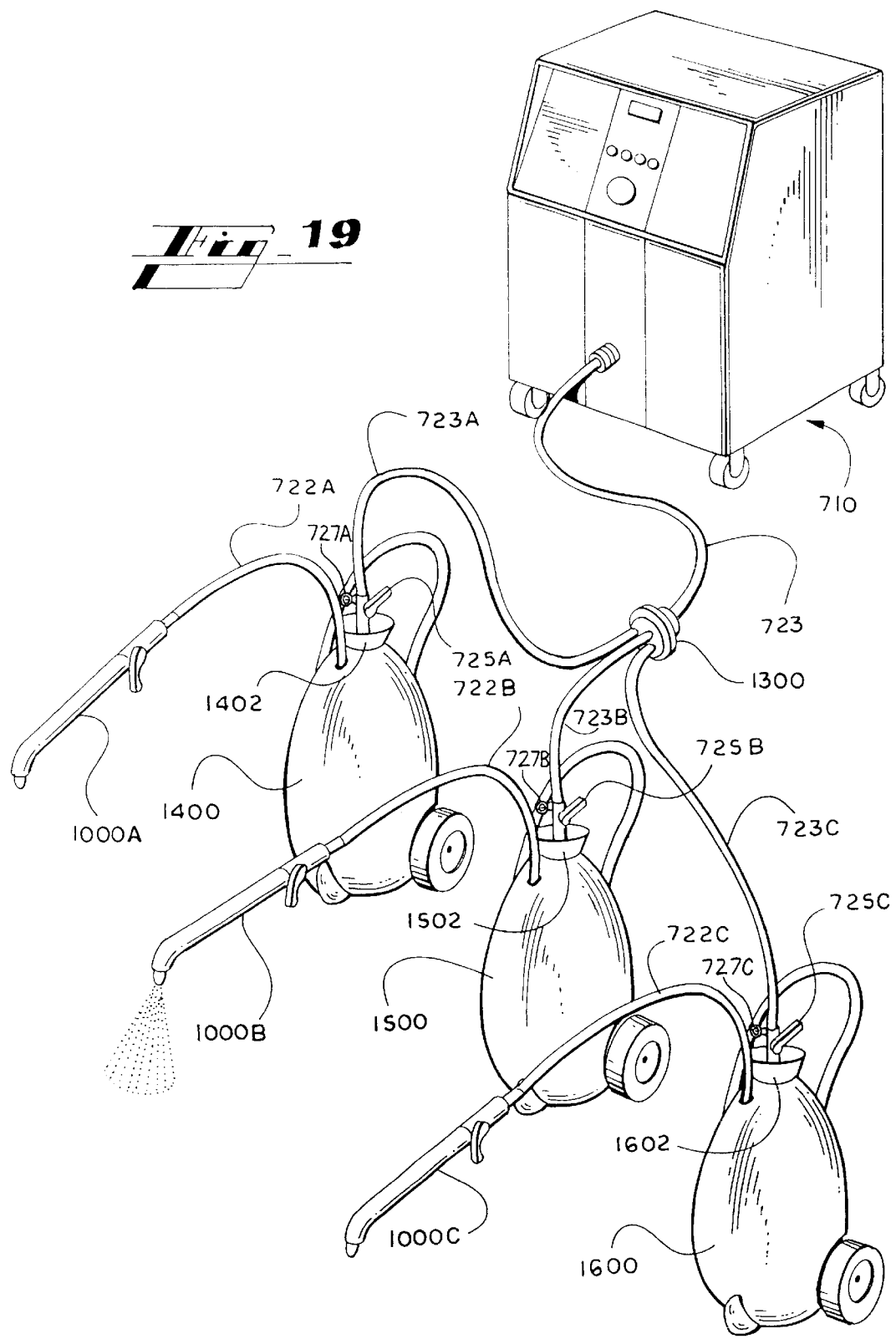

PORTABLE SPRAY CAR WASH DEVICE

RELATED APPLICATIONS

This is a continuation-in-part of patent application Ser. No. 10/166,486 filed on Jun. 10, 2002 now U.S. Pat. No. 6,595,438, which was a continuation-in-part of patent application Ser. No. 09/775,031 filed on Feb. 1, 2001, now issued as U.S. Pat. No. 6,446,881 B1 with an issue date of Sep. 10, 2002, and priority based thereupon is hereby claimed.

TECHNICAL FIELD

The present invention relates generally to portable spray devices and, more specifically, to a portable spray car wash device capable of holding and dispensing liquid cleansers and waxes for rubbing into the body and windows of a vehicle; thereby, enabling complete washing and cleaning thereof. The present invention is particularly useful in, although not strictly limited to, automobile detailing applications desiring portability of equipment and materials for mobile washing and cleaning services.

BACKGROUND OF THE INVENTION

The purchase of an automobile represents a considerable expense. For most individuals, even the expense of an economy car can be substantial. However, despite rising sticker prices and increases in fuel costs, luxury and sports automobiles continue to be sought after. Thus, the prestige of driving an attractive car endures.

Some car and truck owners enjoy individualizing their vehicles by purchasing specialty paint jobs, stylish wheels, chrome accessories and ornamental lighting packages. Others prefer to maintain their car, truck, sport utility vehicle (SUV) or van as close to factory issue as possible. Many rely on routine cleaning and maintenance to maximize their enjoyment, as well as the life of their car.

Cleaning and detailing a vehicle instantly improves its appearance. Owners maintain a sense of "new car" appreciation with a clean interior. A shining exterior, on the other hand, conveys a sense of pride to all who see it. Whether luxury or economy, a car with a freshly cleaned and waxed body and spotless windows is to be admired.

Unfortunately, cleaning and detailing a car, truck, SUV or van is a time-consuming and labor-intensive endeavor. Automatic car wash facilities have become increasingly available, with many directly associated with fueling stations. These automated facilities do provide convenience; however, they are unable to offer detailed cleaning. Hand wash and detail centers offer detailing and hand cleaning, however, sacrifice some of the convenience. Since hand cleaning necessarily requires more time than an automatic car wash, the vehicle owner must either make an appointment to leave his or her car, or must wait while the job is completed.

One recently introduced alternative, wherein the benefits of hand cleaning and detailing are combined with total convenience, is mobile detailing service. Such a service travels to the vehicle, either at home or place of business, and completely cleans and details the car while it is parked and otherwise unneeded. These mobile detailing service professionals utilize a variety of cleaning tools, solutions, and products, and must transport them to each location.

Devices have been introduced to enable various mobile cleaning applications. One type of mobile cleaning apparatus, such as described in U.S. Pat. No. 3,680,786 to Levy and U.S. Pat. No. 4,967,960 to Futrell, connects to a water source; thereby, enabling the selective spray application of a cleaning solution entrained in water or water for rinsing. The disadvantageous reliance of this type of device on an external water source limits its true mobile usability. Other devices, such as described in U.S. Pat. No. 3,797,744 to Smith and U.S. Pat. No. 5,064,123 to Aiello, et al., further limit their portability by depending upon external power and air supplies, often in addition to a water source. Such limitations inhibit truly moveable use.

Alternative types of mobile cleaning apparatus' are described in U.S. Pat. No. 5,029,758 to Chayer, U.S. Pat. No. 4,089,446 to Logan, U.S. Pat. No. 3,831,849 to Studinger, and U.S. Pat. No. 4,546,903 to Burch. These devices still depend upon water, however, they do provide an on-board water supply tank; thus, eliminating the need to connect to an external water source. Some also have the ability to rely on battery power to enable free movement. However, the tank size, in addition to the considerable weight of multiple gallons of water, disadvantageously inhibits true portability and maneuverability.

Therefore, it is readily apparent that there is a need for a portable spray car wash device enabling complete detailing of a vehicle without the use of water, wherein cleansers and waxes for rubbing into the body and windows of a vehicle are held and dispensed thereby; thus, preventing the above-discussed disadvantages.

BRIEF SUMMARY OF THE INVENTION

Briefly described, the present invention overcomes the above-mentioned disadvantages, and meets the recognized need for such a device, by providing a portable spray car wash device capable of holding and dispensing liquid cleansers and waxes for rubbing into the body and windows of a vehicle; thereby, enabling portability of equipment and materials for mobile washing and cleaning services.

According to its major aspects, and broadly stated, the present invention is a portable, battery powered spray applicator device enabling complete detailing of a vehicle without the use of water, wherein a variety of liquid cleansers and waxes for rubbing into the body and windows of a vehicle are held and dispensed thereby.

More specifically, in a first preferred embodiment, the present invention provides a portable cart for housing equipment and materials for washing and cleaning vehicles. The wheeled cart has a base platform supporting three reservoir containers, at least one motor, a battery and a battery charger. A housing surrounds the platform, protectively covering the equipment held therewithin.

An AC power receptacle is located within the housing, wherein a power cord is attached thereto for operating the battery charger. An external control panel is also provided within the housing. The panel includes switches and controls that are appropriately linked to the battery, battery charger, and sprayers, whereby each may be turned on or off, and whereby flow of the chemical solutions may be controlled. The panel also includes an emergency stop override switch, whereby power flow can be immediately interrupted. Ventilation panels are defined through the housing to provide necessary airflow to and from the enclosed equipment. Several handles are attached to the exterior of the housing, whereby the device is easily pushed, pulled, and lifted. A toolbox is mounted within the housing, wherein access thereto is provided by an exterior door flush with the housing.

The three reservoir containers are accessible above the upper surface of the housing, wherein each container has a user-accessible threaded cap mounted thereon. Each cap may have a handle, whereby the user can loosen or tighten the cap as necessary for removal or replacement thereof. Each of the three containers is linked to a motor; thereby, enabling controlled spraying of selected container contents through a hose and spray trigger. A first container holds a chemical solution for spraying onto the metal and/or fiberglass shell of an automobile, for rubbing into the shell and removing dirt, grime, and grease therefrom. A second container holds a glass cleaning solution for spraying onto the windshield and windows of an automobile, for rubbing off and cleansing the windshield and windows. A third container holds a liquid wax for spraying onto the metal and/or fiberglass shell of an automobile, for rubbing into the metal and/or fiberglass for a polished shine.

In a second preferred embodiment, the portable cart of the first preferred embodiment neither carries nor supports the reservoir containers. Rather, an ancillary portable cart is provided for use in association with the primary portable cart for carrying one or more reservoir containers. The ancillary cart is provided with wheels for mobility; and, further, may be provided with shelves useful for holding reservoir containers and supplies, and hooks useful for supporting one or more sprayer nozzles.

Because the ancillary cart provides separate access to the reservoir containers, the containers advantageously may be removed from the ancillary cart and carried upon the person of the user operator, as with a belt and holder arrangement; thus, extending the useful operating distance of the invention and providing ease of use and portability heretofore unknown in the art.

Modifications to the sprayer nozzle provides for more accurate and consistent fluid and air supply control. Separate pressurization of the reservoir container, as through a pump and piston arrangement, provides additional fluid pressure useful either for extending spraying distance or for extending the number of vehicles that may be processed.

Accordingly, a feature and advantage of the present invention is the ability of such a device to provide a portable spray car wash device that enables complete detailing of a vehicle without the use of water.

Another feature and advantage of the present invention is the ability of such a device to hold and dispense cleansers and waxes for rubbing into the body and windows of a vehicle.

Another feature and advantage of the present invention is the ability of such a device to provide a portable cart having equipment and materials for washing and cleaning vehicles.

Another feature and advantage of the present invention is the ability of such a device to provide a battery-operated, rechargeable, portable spray car wash unit.

Another feature and advantage of the present invention is the ability of such a device to provide user-actuated flow control for spray dispensing of cleansers and waxes for rubbing into the body and windows of a vehicle.

Another feature and advantage of the present invention is the ability of such a device to provide a portable cart for washing and cleaning vehicles, wherein several handles are provided for ease of mobility.

Another feature and advantage of the present invention is the ability of such a device to provide a portable cart for washing and cleaning vehicles, wherein one or more hooks are provided for carrying hanging supplies.

Another feature and advantage of the present invention is the ability of such a device to provide an on-board toolbox for portable access to tools.

Another feature and advantage of the present invention is the ability of such a device to provide three reservoir containers, each having an independent sprayer, whereby cross-contamination of container contents is prevented.

Another feature and advantage of the present invention is the ability of such a device to provide a reservoir container for holding a chemical solution for spraying onto the metal and/or fiberglass shell of an automobile, for rubbing into the shell and removing dirt, grime, and grease therefrom.

Another feature and advantage of the present invention is the ability of such a device to provide a reservoir container for holding a glass cleaning solution for spraying onto the windshield and windows of an automobile, for rubbing off and cleansing the windshield and windows.

Another feature and advantage of the present invention is the ability of such a device to provide a reservoir container for holding a liquid wax for spraying onto the metal and/or fiberglass shell of an automobile, for rubbing into the metal and/or fiberglass for a polished shine.

Another feature and advantage of the present invention is the ability of such a device to provide an ancillary portable cart for use in association with the primary portable cart for carrying one or more reservoir containers.

Another feature and advantage of the present invention is the ability of such a device to provide separate access to the reservoir containers, so that the containers advantageously may be removed from the ancillary cart and carried upon the person of the user operator, as with a belt and holder arrangement; thus, extending the useful operating distance of the invention and providing ease of use and portability to the user.

Another feature and advantage of the present invention is the ability of such a device to provide separate pressurization of the reservoir container, as through a pump and piston arrangement, in order to provide additional fluid pressure useful either for extending spraying distance or for extending the number of vehicles that may be processed.

Another feature and advantage of the present invention is the ability of such a device to provide an elongated or extended spray nozzle for improved reach and cleaning of either the roof or underside of vehicles.

Another feature and advantage of the present invention is the ability of such a device to provide an elongated or extended spray nozzle for beneficially distancing the operator of the device from chemical mists or sprays expelled from the nozzle, thus reducing the likelihood of inhaling same.

Another feature and advantage of the present invention is the ability of such a device to provide direct pressurization of multiple reservoir containers for providing the requisite fluid pressure to enable desired fluid spraying force and distance.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing Figures, in which like reference numerals denote similar structure and refer to like elements throughout, and in which:

FIG. 5 is a perspective cutaway view of portable spray car wash device according to a first alternate embodiment of the present invention;

FIG. 6 is a side cutaway view of the portable spray car wash device of FIG. 5;

FIG. 7 is a perspective cutaway view of portable spray car wash device according to a second alternate embodiment of the present invention;

FIG. 8 is a perspective cutaway view of portable spray car wash device according to a third alternate embodiment of the present invention;

FIG. 9 is a side cutaway view of the portable spray car wash device of FIG. 8;

FIG. 11 is a perspective view of the portable spray car wash device according to a second preferred embodiment of the present invention;

FIG. 12 is a side view of the ancillary cart according to the second preferred embodiment of FIG. 11;

FIG. 15 is a perspective view of the user belt of the second preferred embodiment of the present invention, useful for carrying one or more reservoir containers and sprayer nozzles;

FIG. 16 is a perspective view of the user belt of the second preferred embodiment of the present invention, further demonstrating a reservoir container having separate pressurization, as through a pump and piston arrangement, to provide additional fluid pressure;

FIG. 17 is a perspective view of an alternate embodiment of the ancillary cart according to the second preferred embodiment of the present invention, demonstrating the carrying of an enlarged capacity, pressurized reservoir container;

FIG. 18A is a perspective view of an alternate embodiment of the present invention in operational use according to its intended function, demonstrating the utilization of an elongated sprayer nozzle;

FIG. 18B is a side view of the elongated sprayer nozzle of the alternate embodiment of FIG. 18A; and, FIG. 19 is a perspective view of an alternate embodiment of the present invention, demonstrating the carrying of multiple enlarged capacity, direct-pressurized reservoir containers.

It is to be noted that the drawings are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
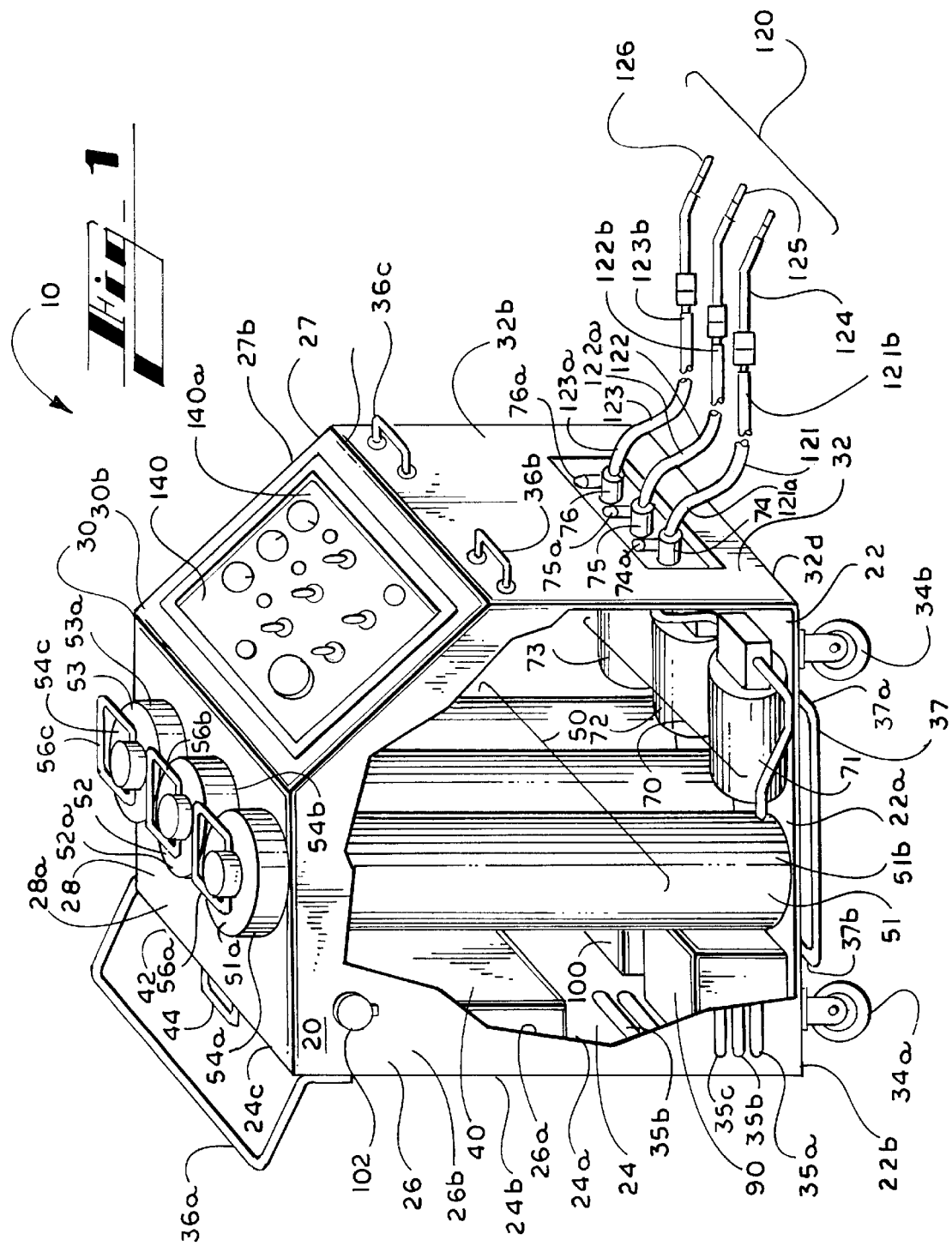
FIG. 1 is a perspective cutaway view of portable spray car wash device according to a first preferred embodiment of the present invention.
Figure 2:
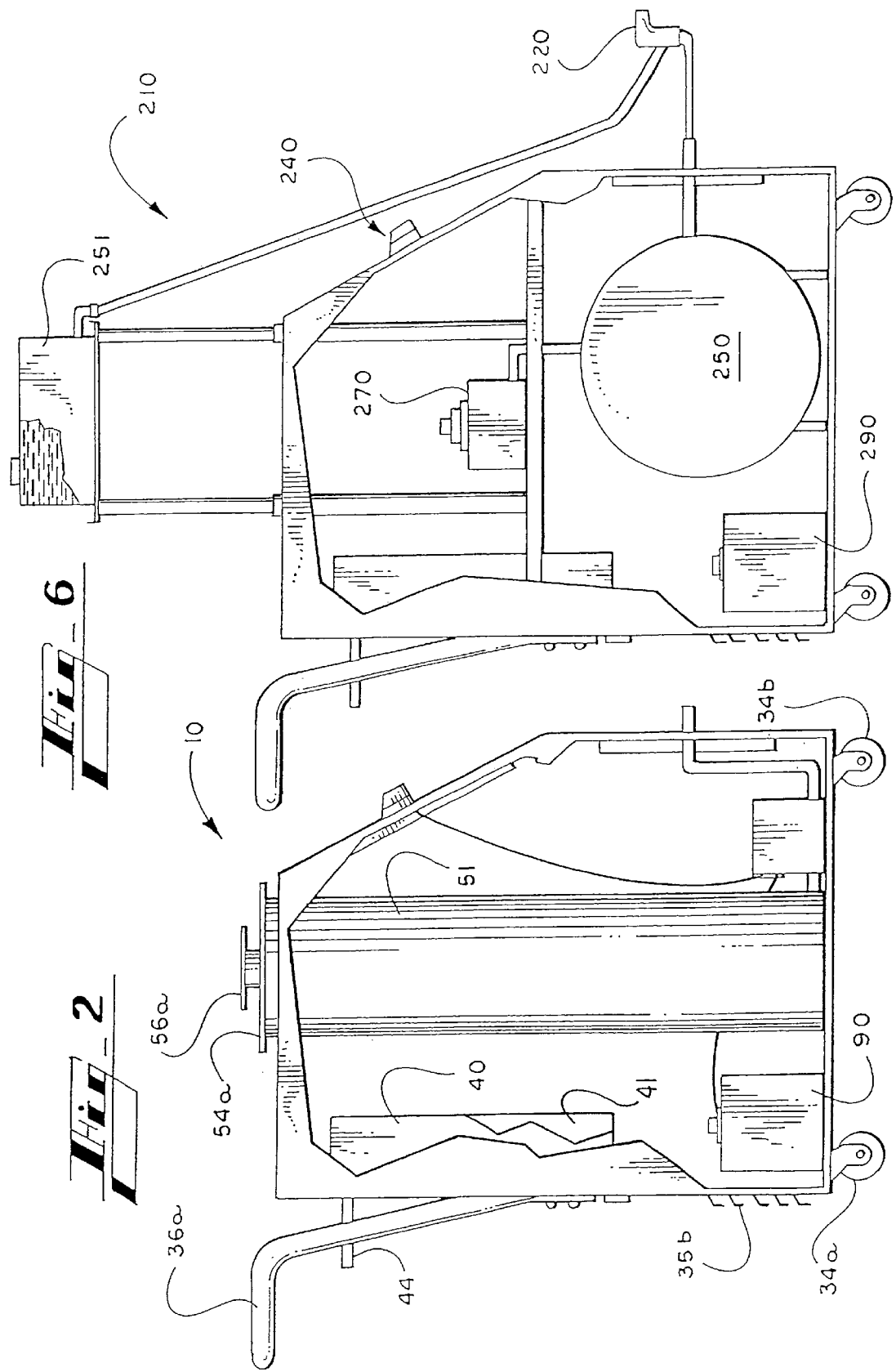
FIG. 2 is a side cutaway view of the portable spray car wash device of FIG. 1.

Referring now to FIG. 1 and FIG. 2, the present invention is a portable spray car wash device 10 comprising portable cart housing 20, reservoir containers 50, motors 70, battery 90, battery charger 100, spray applicators 120 and control panel 140.

Preferably, portable cart housing 20 is defined by substantially horizontal base wall 22, substantially vertical rear wall 24, substantially vertical first side wall 26 and second side wall 27, substantially horizontal top wall 28, angled first front wall 30 and substantially vertical second front wall 32. Base wall 22 and top wall 28 have upper surfaces 22a and 28a, respectively, and lower surface 22b and 28b, respectively. Rear wall 24, first side wall 26, second side wall 27, angled first front wall 30 and second front wall 32 have inner surfaces 24a, 26a, 27a, 30a and 32a, respectively, and outer surfaces 24b, 26b, 27b, 30b and 32b, respectively.

Portable cart housing 20 preferably has four wheels, 34a, 34b, 34c and 34d, wherein wheels 34a, 34b, 34c and 34d are pivotally secured to lower surface 22b of base wall 22. Preferably, ventilation panels 35a, 35b and 35c are defined through first side wall 26, rear wall 24 and second side wall 27, respectively, of portable cart housing 20 to provide airflow to and from equipment enclosed therewithin.

Preferably, handles 36a, 36b, 36c, 37 and 38 (not shown) are secured to portable cart housing 20. Preferably, handle 36a is positioned substantially horizontally on outer surface 24b of rear wall 24 and secured thereto proximate to upper edge 24c, extending from first side wall 26 to second side wall 27 to provide for user hand-controlled positioning of portable spray car wash device 10. Preferably, handles 36b and 36c are positioned substantially horizontally on outer surface 32b of second front wall 32 and secured thereto proximate to upper edge 32c, proximate to first side wall 26 and second side wall 27, respectively, to provide for user hand-controlled positioning of portable spray car wash device 10. Handles 37 and 38 have first ends 37a and 38a, respectively, and second ends 37b and 38b, respectively. Preferably, first ends 37a and 38a of handles 37 and 38, respectively, are secured to outer surface 32b of second front wall 32, proximate to lower edge 32d. Preferably, second ends 37b and 38b of handles 37 and 38, respectively, are secured to outer surface 24b of rear wall 24, proximate to lower edge 24d. Preferably, handles 37 and 38 extend from second front wall 32 to rear wall 24, passing substantially horizontally proximate to outer surfaces 26b and 27b, respectively, of first side wall 26 and second side wall 27, respectively, to provide for holding and lifting of device 10 into and from a transporting vehicle.

Toolbox 40 is preferably mounted within portable cart housing 20, wherein access to inner compartment 41 thereof is preferably provided by hingedly secured exterior door 42. Preferably, door 42 of toolbox 40 is positioned substantially flush within rear wall 24 of portable cart housing 20. Handle 44 of door 42 is secured thereto, preferably positioned substantially horizontally proximate to top edge 24c of rear wall 24 of portable cart housing 20.

Preferably, reservoir containers 50 are substantially cylindrically shaped. First reservoir container 51, second reservoir container 52 and third reservoir container 53 have first ends 51a, 52a and 53a and second ends 51b, 52b and 53b, respectively. Preferably, second ends 51b, 52b and 53b of reservoir containers 51, 52 and 53, respectively, are positioned on upper surface 22a of base wall 22 of portable cart housing 20. Preferably, first ends 51a, 52a and 53a of reservoir containers 51, 52 and 53, respectively, extend through top wall 28 enabling user access thereto.

Each reservoir container 51, 52 and 53 preferably has removable cap 54a, 54b and 54c, respectively, threadedly provided thereon. Each cap 54a, 54b and 54c preferably has handle 56a, 56b and 56c, respectively, provided thereon, whereby a user can loosen or tighten caps 54a, 54b and 54c as necessary for removal or replacement thereof, such as when filling of reservoir containers 51, 52 and 53 is desired.

Preferably, first reservoir container 51 is manufactured to enable storage of a user-selected chemical solution for spraying onto a metal or fiberglass shell of an automobile, wherein rubbing of the solution into the automobile shell removes dirt, grime, and grease therefrom. Preferably, second reservoir container 52 is manufactured to enable storage of a user-selected glass cleaning solution for spraying onto a windshield and windows of an automobile, wherein rubbing cleanses the windshield and windows. Preferably, third reservoir container 53 is manufactured to enable storage of a user-selected liquid wax for spraying onto a metal or fiberglass shell of an automobile, wherein rubbing polishes and shines the metal or fiberglass.

Reservoir containers 50 are linked to motors 70. Preferably, reservoir container 51 is linked to motor 71, reservoir container 52 is linked to motor 72 and reservoir container 53 is linked to motor 73. Each motor 71, 72 and 73 directs a pressurized flow of liquid contents from reservoir containers 51, 52 and 53, respectively, into outlets 74, 75 and 76, respectively. Preferably, motors 70 are positioned on upper surface 22a of base wall 22 of portable cart housing 20, proximate to second front wall 32. Gauges 74a, 75a and 76a are preferably provided for outlets 74, 75 and 76, respectively, whereby a user can selectively view the levels of liquid in the respective reservoir container associated therewith.

Preferably, battery 90 is positioned on upper surface 22a of base wall 22 of portable cart housing 20, proximate to rear wall 24. Battery 90 is preferably 12 volt, 60 Amp, and is linked to motors 70, whereby power is supplied for operation thereof. Preferably, battery charger 100 is 6 Amp and is positioned on upper surface 22a of base wall 22 of portable cart housing 20, proximate to rear wall 24. Preferably, battery charger 100 is linked to battery 90, whereby recharging of battery 90 is enabled. Battery charger 100 is powered by common household AC current, and is linked to AC power receptacle 102 whereby power is supplied. Preferably, AC power receptacle 102 is positioned on first side wall 26 of portable cart housing 20, whereby a user-supplied power cord is inserted therein to supply power to battery charger 100.

Spray applicators 120 are preferably provided, wherein first end 121a, 122a and 123a of hoses 121, 122, and 123 are removably connected to outlets 74, 75 and 76, respectively, to receive a pressurized flow of liquid contents therefrom. Preferably, spray triggers 124, 125 and 126 are removably connected to second end 121b, 122b and 123b of hoses 121, 122 and 123, respectively.

Figure 3:
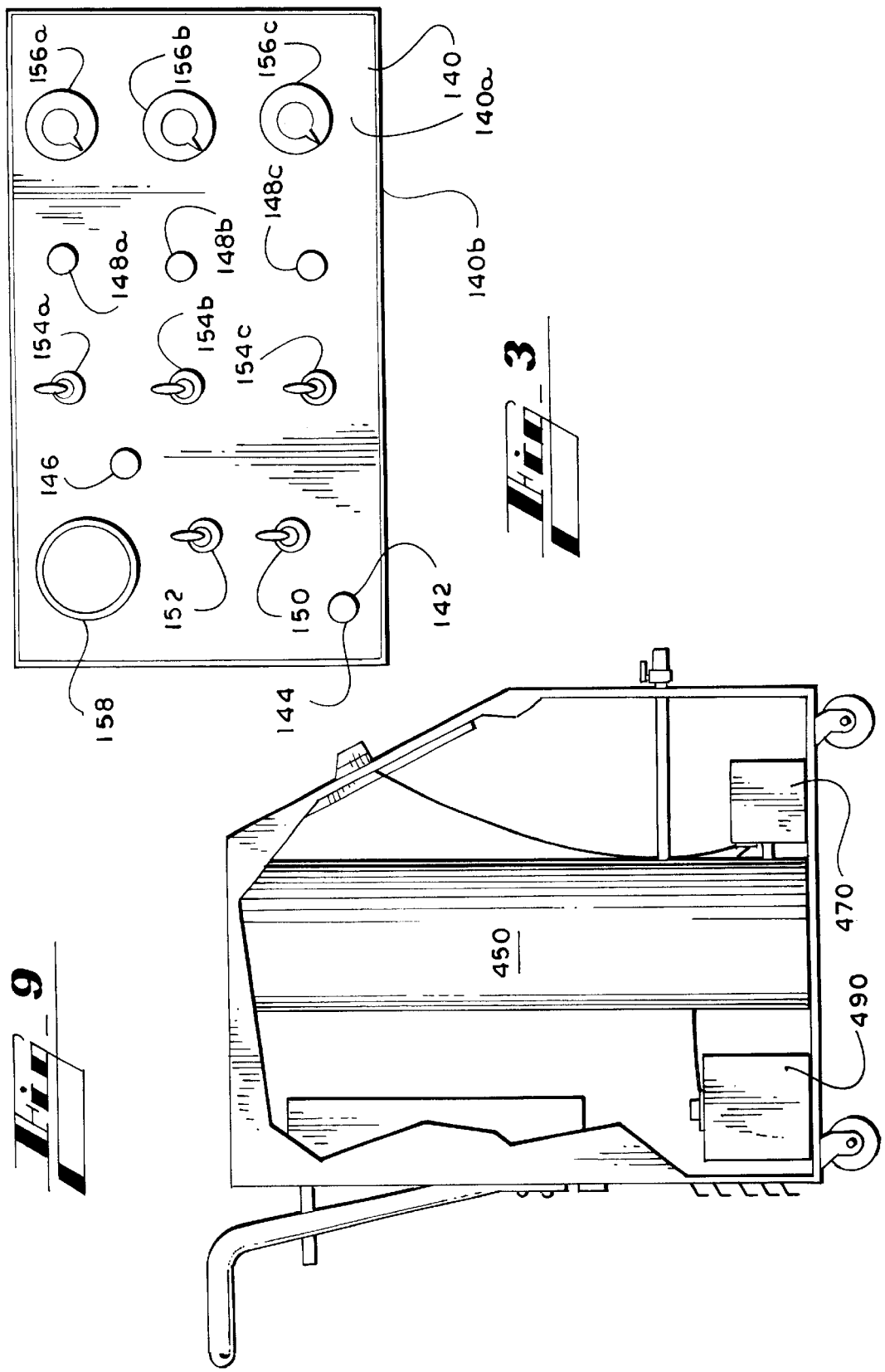
FIG. 3 is a front view of a control panel of the portable spray car wash device of FIG. 1.

Control panel 140 has an outer surface 140a, an inner surface 140b and is preferably positioned on outer surface 30b of second front panel 30 of portable cart housing 20. As best seen in FIG. 3, control panel 140 enables user control of provided features of portable spray car wash device 10.

Fuse 142 is provided within control panel 140. Preferably, fuse 142 is 2 amp, 125 volt, and is easily accessible from outer surface 30b of second front panel 30 of portable cart housing 20. Preferably, fuse indicator light 144 is positioned on outer surface 140a of control panel 140, whereby fuse status can be readily ascertained by a user.

Preferably, power indicator light 146 is positioned on outer surface 140a of control panel 140, whereby power status of portable spray car wash device 10 can be readily ascertained by a user. Preferably, pump indicator lights 148a, 148b and 148c are positioned on outer surface 140a of control panel 140, whereby operational status of motors 71, 72 and 73, respectively, can be readily ascertained by a user.

Battery control switch 150 is preferably positioned on outer surface 140a of control panel 140, whereby a user can selectively enable or disable the flow of power from battery 90 to motors 70. Power indicator light 146 is illuminated upon successful activation of battery control switch 150. Wherein battery control switch 150 is activated, but no flow of power from battery 90 to motors 70 results, power indicator light 146 remains unlit, thereby notifying a user that battery 90 needs to be recharged.

AC/charge control switch 152 is preferably positioned on outer surface 140a of control panel 140, whereby a user can selectively enable or disable the flow of AC power from AC power receptacle 102 to battery charger 100, thereby enabling or disabling recharging of battery 90.

Pump control switches 154a, 154b and 154c are preferably positioned on outer surface 140a of control panel 140, whereby a user can selectively enable or disable the operation of motors 71, 72 and 73, respectively. Pump indicator lights 148a, 148b and 148c are preferably independently illuminated upon successful activation of pump control switches 154a, 154b and 154c, respectively.

Speed control knobs 156a, 156b and 156c are preferably positioned on outer surface 140a of control panel 140, whereby a user can selectively adjust the flow of chemical solution via respective motors 71, 72 and 73 to spray triggers 124, 125 and 126, thereby controlling the flow-rate and volume of liquid spray being dispensed thereby.

Preferably, emergency stop switch 158 is positioned on positioned on outer surface 140a of control panel 140, whereby a user can selectively override all activated switches, immediately interrupting the flow of power and ceasing operation of portable spray car wash device 10.

Figure 4:
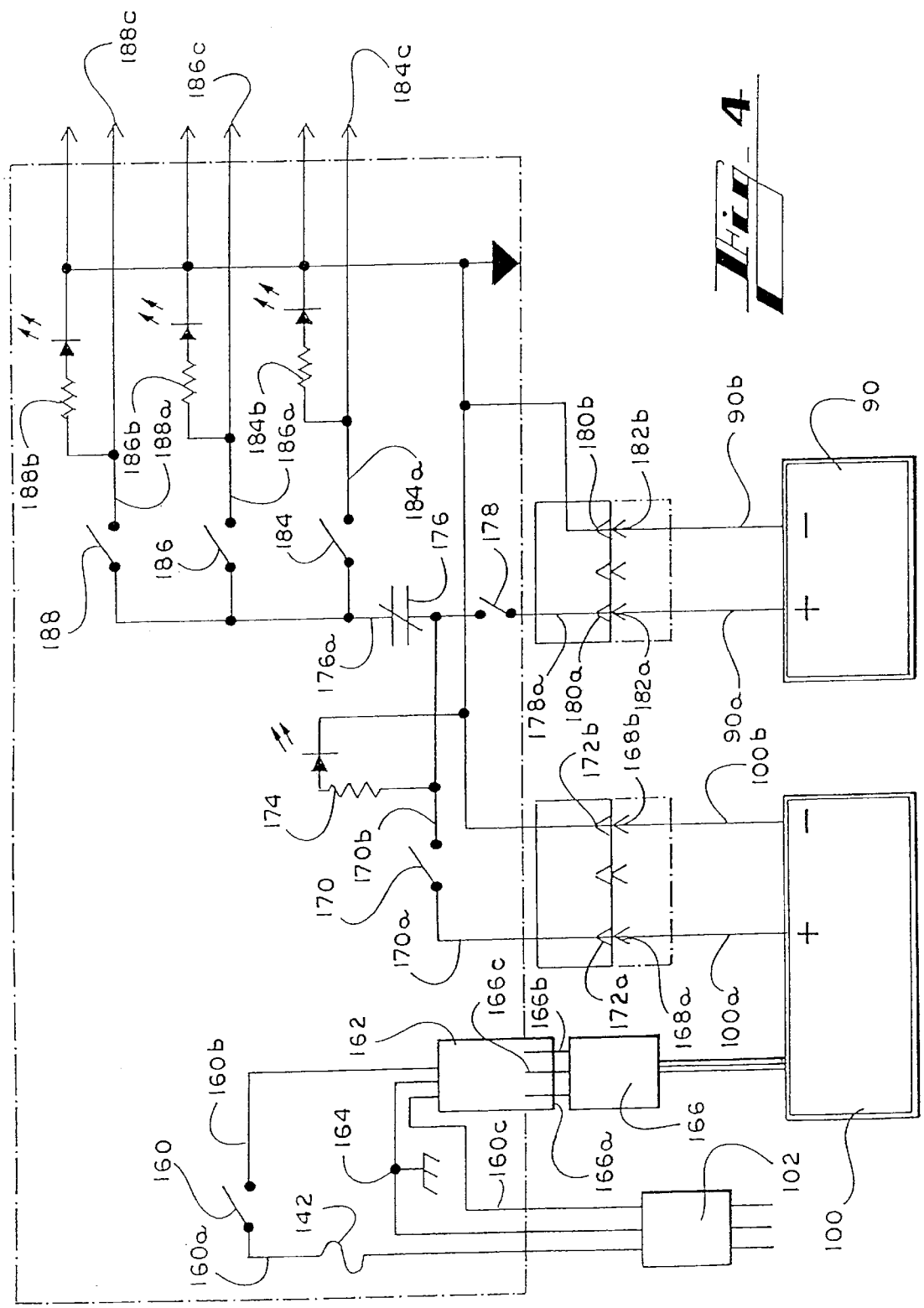
FIG. 4 is a schematic diagram of the control panel of FIG. 3.

The preferred schematics of control panel 140 are best seen in FIG. 4. AC/power control switch 158 is schematically represented by switch 160. A first terminal of switch 160 is electrically connected by conductor 160a through fuse 142 to an AC source at receptacle 102. A second terminal of switch 160 is electrically connected by conductor 160b to AC socket 162. Ground wire 164 and conductor 160c are connected between receptacle 102 and AC socket 162. AC plug 166 is electrically connected to AC socket 162 via conductors 166a and 166b and ground 166c.

AC plug 166 extends from battery charger 100, whereby AC power is received. Conductor 100a connects anodic terminal of battery charger 100 to connector plug 168a. Preferably, connector plug 168a has a three-pin configuration. Conductor 100b connects cathodic terminal of battery charger to connector plug 168b. Preferably, connector plug 168b has a three-pin configuration.

Battery charge control switch 152 is schematically represented by switch 170. A first terminal of switch 170 is electrically connected by conductor 170a to connector receptacle 172a. Preferably, connector receptacle 172a has a three-pin configuration, whereby connector plug 168a may be inserted therein. A second terminal of switch 170 is electrically connected by conductor 170b to resistor 174, thereby operating power indicator light 146, to switch 176, the schematic representation of emergency stop switch 158, to connector receptacle 180b and to switch 178. Preferably, resistor 174 is a 3K, ½W, 5% resistor.

Battery control switch 150 is schematically represented by switch 178. A first terminal of switch 178 is electrically connected by conductor 178a to connector receptacle 180a. Preferably, connector receptacles 180a and 180b have a three-pin configuration.

Conductor 90a connects anodic terminal of battery 90 to connector plug 182a. Preferably, connector plug 182a has a three-pin configuration, whereby connector receptacle 180a is inserted therein. Conductor 90b connects cathodic terminal of battery 90 to connector plug 182b. Preferably, connector plug 182b has a three-pin configuration, whereby connector receptacle 180b is inserted therein.

Pump control switches 154a, 154b and 154c are schematically represented by switches 184, 186 and 188, respectively. A first terminal of switches 184, 186 and 188 is electrically connected to switch 176 by conductor 176a. A second terminal of switches 184, 186 and 188 is electrically connected by respective conductors 184a, 186a and 188a to respective connector receptacles 184c, 186c and 188c. Preferably, connector receptacles 184c, 186c and 188c have a two-pin configuration. The second terminal of switches 184, 186 and 188 is also electrically connected by respective conductors 184a, 186a and 188a to respective resistors 184b, 186b and 188b, thereby operating respective pump indicator lights 148a, 148b and 148c. Preferably, resistors 184b, 186b and 188b are 3K, ½W, 5% resistor.

It will be recognized that control panel 140 could be configured without fuse indicator light 144, power indicator light 146 and/or pump indicator lights 148a, 148b and 148c therein.

It also will be recognized that portable cart housing 20 could define a substantially cylindrical shape.

It will be further recognized that portable cart housing 20 could have three wheels, whereby increased maneuverability could be provided.

Additionally, it will be recognized that first ends 51a, 52a and 53a of reservoir containers 51, 52 and 53, respectively, could be positioned within portable cart housing 20, wherein removable caps 54a, 54b and 54c could extend through top wall 28 into respective reservoir containers 51, 52 and 53, threadedly seating therein.

It will be still further recognized that handles 56a, 56b and 56c of caps 54a, 54b and 54c could be integrally formed therein.

It will be yet further recognized that portable spray car wash device 10 could be solar powered.

It will be recognized also that second end 121b, 122b and 123b of hoses 121, 122 and 123 could have quick-connect adaptors provided thereon, enabling easy connection and removal of spray triggers 124, 125 and 126 thereto.

In use, lids 54a, 54b and 54c are removed from reservoir containers 51, 52 and 53. First container 51 is filled with a user-provided chemical solution for spraying onto the metal and/or fiberglass shell of an automobile, for rubbing into the shell and removing dirt, grime and grease therefrom. Second container 52 is filled with a user provided glass cleaning solution for spraying onto the windshield and windows of an automobile, for rubbing off and cleansing the windshield and windows. Third container 53 is filled with a user provided liquid wax for spraying onto the metal and/or fiberglass shell of an automobile, for rubbing into the metal and/or fiberglass for a polished shine.

Handles 36a, 36b, 36c, 37 and 38 are utilized to push, pull or otherwise maneuver portable spray car wash device 10 into position, proximate to a vehicle to be cleaned. Battery control switch 150 is positioned to permit a flow of power from battery 90 to motors 71, 72 and 73. Depending upon user preference and vehicle needs, a pump control switch 154a, 154b or 154c is selected. Pump control switch 154a is switched to the "On" position to engage motor 71, thereby accessing the liquid contents of reservoir container 51 for application via spray nozzle 124. Pump control switch 154b is switched to the "On" position to engage motor 72, thereby accessing the liquid contents of reservoir container 52 for application via spray nozzle 125. Pump control switch 154c is switched to the "On" position to engage motor 73, thereby accessing the liquid contents of reservoir container 53 for application via spray nozzle 126.

Depending upon which spray nozzle 124, 125 or 126 is being utilized, flow therefrom is user-controlled via respective knobs 156a, 156b or 156c.

If battery 90 loses power, a user-supplied power cord is inserted into AC power receptacle 102, and AC/charge control switch 152 is activated, thereby enabling recharging thereof.

Advantageously to the present invention, paper towels may be used to polish the vehicle surface following application of each chemical. Such paper products may, of course be recycled or disposed of in an environmentally sound manner. Rugs may be laundered to make them environmentally safe and clean. Waste materials collected by the laundering processes may be treated and stored away by the municipal or county governments, in some cases for a fee. Accordingly, the adverse environmental impact of the device of the present invention is minimized, along with the cleaning byproducts thereof.

In a first alternate embodiment, shown in FIGS. 5 and 6, a portable spray car wash device 210 comprises a configuration wherein an air compressor mechanism is used to direct fluid distribution. Accordingly, horizontally mounted air tank 250 is connected to compressor motor 270 to provide positive air pressure to the system. Battery 290 and battery charger 200 are provided to power the system in the manner previously described. Shelf 256 is provided with stand-offs 257 integrally connected to the framework of device 210 in order to support chemical reservoirs 251, 252, 253. Each reservoir 251, 252, 253 is connected to fluid line 222 (only one shown for clarity). Air hose 223 is connected to air tank 250. Fluid line 222 and air hose 223 are connected to sprayer 220 in order to deliver sufficient pressure to sprayer 220 to draw chemical fluid from reservoirs 251, 252, 253, respectively, and to effectuate delivery of the fluid through sprayer 220 onto a vehicle surface. Control panel 240 is provided in order to control motor activation, air pressure, and related functionality, in the manner previously described with regard to FIGS. 1–3.

In a second alternate embodiment, shown in FIG. 7, a portable spray car wash device 310 comprises a configuration wherein an air compressor mechanism is used to direct fluid distribution. Accordingly, horizontally mounted air tank 350 is connected to compressor motor 370 to provide positive air pressure to the system. Battery 390 and battery charger 300 are provided to power the system in the manner previously described. Bolt hole patterns 356 are provided in order to integrally connect to the framework of device 310 chemical reservoirs 351, 352 (not shown), 353 (not shown). Each reservoir 351, 352, 353 is connected to fluid line 322 (only one shown for clarity). Air hose 323 is connected to air tank 350. Fluid lines 322 and air hose 323 are connected to sprayer 320 in order to deliver sufficient pressure to sprayer 320 to draw chemical fluid from reservoirs 351, 352, 353, respectively, and to effectuate delivery of the fluid through sprayer 320 onto a vehicle surface.

In a third alternate embodiment, shown in FIGS. 8–9, a portable spray car wash device 410 comprises a configuration wherein an air compressor mechanism is again used to direct fluid distribution. Accordingly, vertically mounted air tank 450 is connected to compressor motor 470 to provide positive air pressure to the system. Battery 490 and battery charger 400 are provided to power the system in the manner previously described. Air hose 423 is connected to air tank 450. Interchangeable, integral reservoir sprayers 420 (only one of three shown) are fluidly connected to the end of air hose 423 in a manner well-known in the art in order to provide chemical distribution to the vehicle surface.

Figure 10:
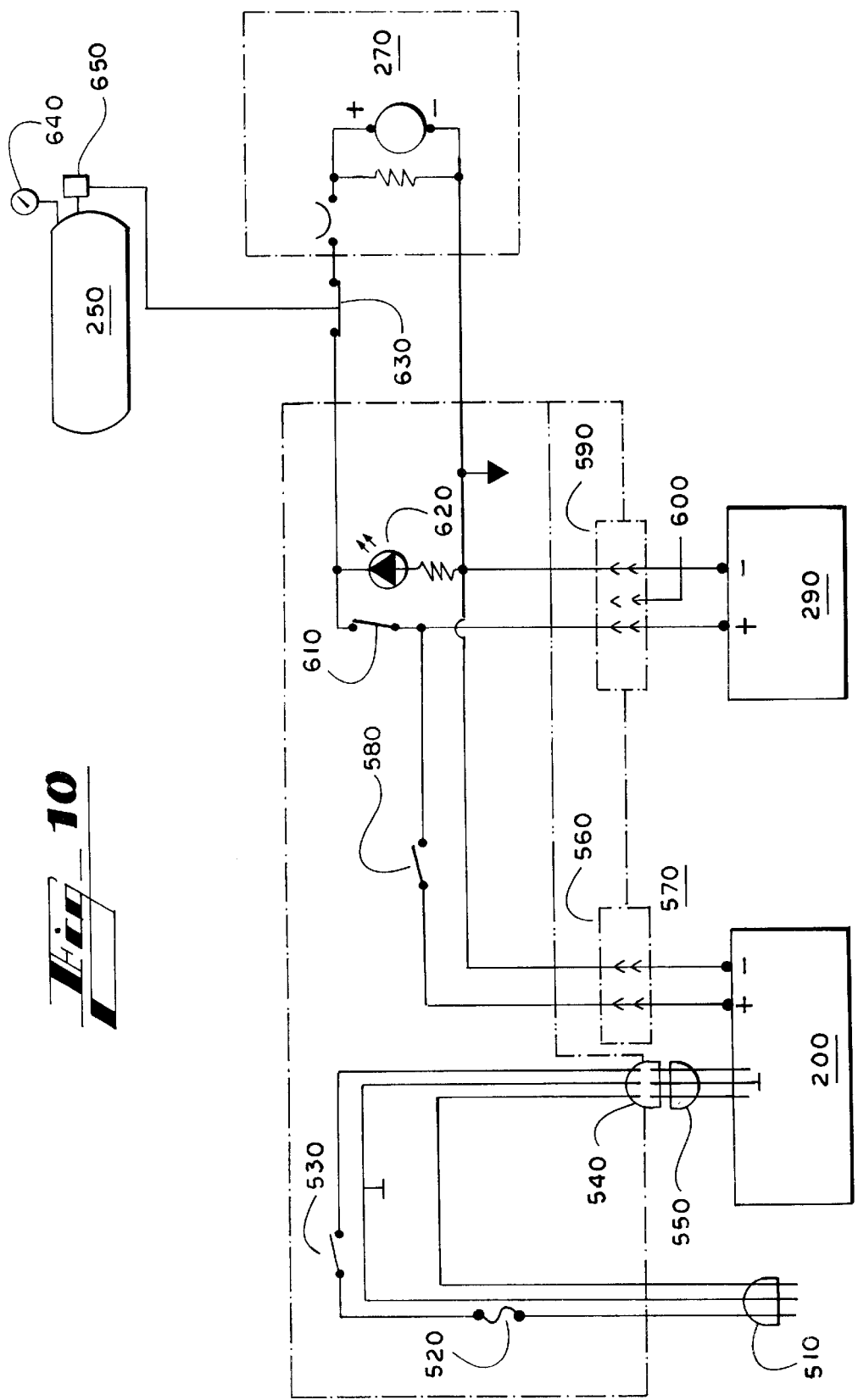
FIG. 10 is a representative schematic diagram of the control panel of FIGS. 5 through 9.

Referring next to FIG. 10, shown is a representative schematic diagram of the control system of the embodiments of the present invention shown in FIGS. 5–9. For the sake of clarity, mechanical component designations described with reference to FIG. 5 are utilized. Accordingly, AC plug 510 is connected through fuse 520, switch 530, ground, and sockets 540, 550 to battery charger 200. Battery charger 200 is connected through jack 560, 590, guide plugs 570, 600, and switch 580 to battery 290. This portion of the power system is connected through switch 610, power indicator 620, and pressure switch 630 to compressor motor 270. Pressure switch 630 is connected to air tank 250. Air tank 250 is connected to pressure gauge 640 and outlet pressure switch 650. Modifications of this diagram will be obvious to one ordinarily skilled in the art, and are within the contemplation and scope of the present invention.

In a second preferred embodiment, best seen with reference to FIGS. 11–17, provided is primary portable cart 710 for use in association with ancillary portable cart 760, air hose 723, sprayer nozzle 720, reservoir container 750, and fluid line 722. As will be recognized by one of ordinary skill in the art, primary cart 710 may be provided with any of those several features discussed hereinabove with regard to the embodiments of FIGS. 1–10 as are deemed desirable for the function of primary cart 710 as described hereinbelow; however, of principal difference, it neither carries nor supports any reservoir containers 750. Rather, ancillary portable cart 760 is provided for use in association with primary cart 710 for carrying one or more reservoir containers 750.

As in the first preferred embodiment, in operation, air hose 723 is interconnected between sprayer nozzle 720 and cart 710, cart 710 carrying such component means, as described hereinabove, for delivering pressurized air to nozzle 720. One end of fluid line 722 is in fluid communication with reservoir container 750. The second end of fluid line 722 is connected to sprayer nozzle 720.

With continuing reference to FIGS. 11–12, ancillary cart 760 is provided with wheels 761, preferably of the caster type, for ease of mobility of cart 760. Wheels 761 enable cart 760 to be moved conveniently by operator O in any desired direction upon a surface. Advantageously, with selection of appropriate lengths of hose 723 and fluid lines 722, use of the lighter and more maneuverable ancillary cart 760 allows the operator O to range reservoir containers 750 farther from the generally heavier and less maneuverable cart 710.

Ancillary cart 760 may be provided with one or more shelves 762, 764, 766, 768 useful for holding one or more reservoir containers 750 and/or useful supplies S. As depicted in FIG. 12, supplies S may comprise articles such as towels, spare chemicals or cleaning preparations, and/or such specialized chemicals or cleaning preparations as may be useful in association with a particular cleaning task or type of vehicle.

Separating shelves 762, 764, 766, 768 and, preferably, one or more horizontal supports 769, are one or more vertical supports 770. Each support 770 may be of single piece construction, or may be of multi-piece construction, such that the component pieces thereof cooperate in joining and positioning shelves 762, 764, 766, 768.

It should be further recognized that ancillary cart 760 may be provided in vertically extensible form for adjustment of the heights and numbers of shelves 762, 764, 766, 768. In such form, well known in the art, support 770 may be formed as a multi-member construction, each intermediate member of which is slideably nested within its adjoining member (e.g., in telescoping arrangement).

Further still, ancillary cart 760 may be manufactured in a form to accommodate the convenient separation of the individual components thereof, for ease of transportation and storage.

Turning again to FIGS. 11–12, shelf 762 may carry one or more slots 763 upon a facing edge thereof. Slots 763 are located and sized so as to accommodate fluid lines 722. Slots 763, used in association with fluid lines 722, serve to aid operator O in determining which fluid line 722 is required for a particular task, and in preventing the tangling of the plurality of lines. Accordingly, through the use of slots 763, an orderly use and appearance of reservoir containers 750 and fluid lines 722 may be maintained.

Carried by horizontal support 769 may be hooks 772 useful for supporting, when not in use, one or more sprayer nozzles 720.

Through the convenient use of this dual-cart configuration, fluid lines 722 may be interconnected to, and removed from, sprayer nozzle 720 in an order and manner to accommodate the cleaning task and vehicle at hand. Of course, multiple sprayer nozzles 720 may be carried by ancillary cart 760, each one of which might be used in association with a particular reservoir container 750 and the solution carried thereby. Accordingly, the use of multiple sprayer nozzles 720 reduces mixing of disparate fluids within the nozzle; and, as will be discussed in greater detail hereinbelow, allows operator O to adjust a particular sprayer nozzle 720 to the air and fluid flow characteristics best suiting the cleaning task and vehicle at hand. By leaving a sprayer nozzle 720 set in corresponding adjustment to a particular solution carried within a fluid reservoir 750, less solution is wasted, and better efficiency is obtained, by avoiding the need to make repeated nozzle adjustments to obtain the required spray and fluid characteristics.

Figure 14:
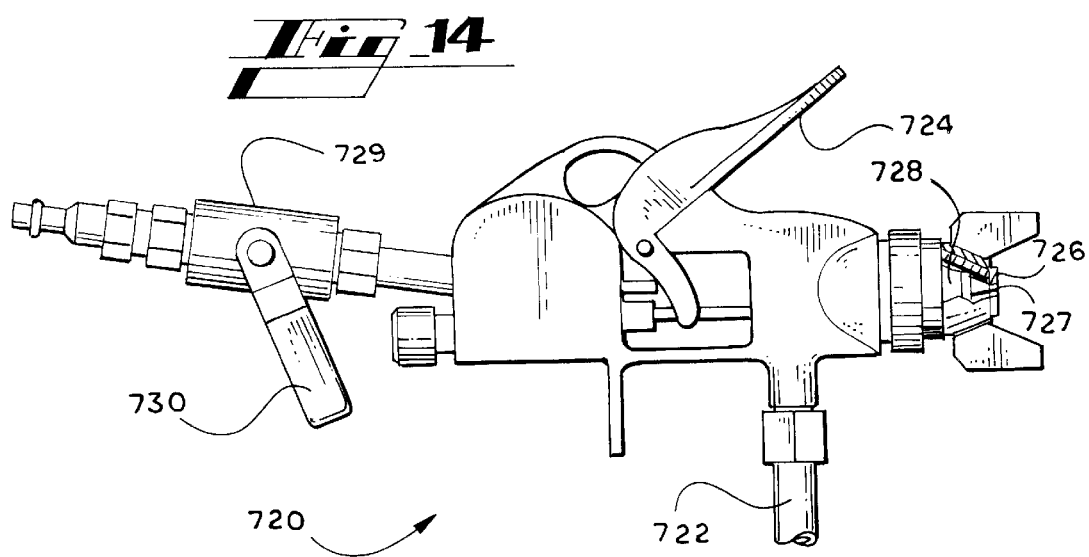
FIG. 14 is a side view of the sprayer nozzle of the second preferred embodiment of the present invention.

Accordingly, in furtherance of the goal of providing for sparing application of solutions, better efficiency in cleaning, and better finished results, FIG. 14 depicts preferred sprayer nozzle 720. Sprayer nozzle 720 carries actuator 724, nozzle 726, and spray orifice 727. Fluid line 722 is interconnected to sprayer nozzle 720 at a fitting thereupon. Air hose 723 is connected at a fitting provided rearward of actuator 724. Nozzles of the type just described are well-known in the art.

In keeping with the above stated goal, sprayer nozzle 720 of the present invention may be modified, as further shown in FIG. 14, by adding valve 729 intermediate air hose 723 and sprayer nozzle 720. Valve 729 provides ancillary control of air volume and pressure provided to sprayer nozzle 720 by allowing fine adjustment thereof by operation of valve 729 through lever 730.

Additionally, because many prior art sprayer nozzles provide multiple orifices for feeding of air and/or solution to nozzle 728, sprayer nozzle 720 is further modified by potting nozzle 726, as with a non-water soluble potting compound such as an epoxy-based compound, to close-off any undesired, surplus orifices. In this way, the pressure and spray characteristics of sprayer nozzle 720 may be tuned to assist in providing the benefits of the above-stated goal; to wit, providing for sparing application of solutions, better efficiency in cleaning, and better finished results.

Figure 13:
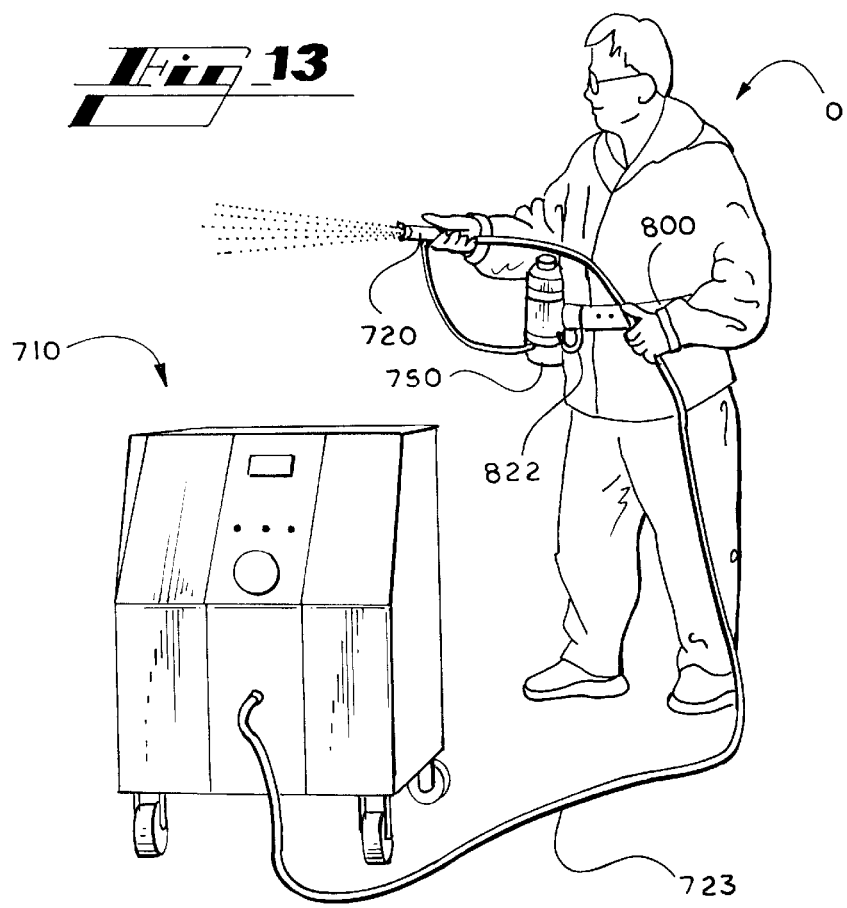
FIG. 13 is a perspective view of the second preferred embodiment of FIG. 11 in operational use according to its intended function, and demonstrating the user thereof carrying a reservoir container of the invention upon his person.

As stated above, and with reference next to FIGS. 13, 15, and 16, because ancillary cart 760 provides separate access to reservoir containers 750, reservoir containers 750 advantageously may be removed from ancillary cart 760 and carried upon the person of operator O, as with belt 800 and holder 810; thus, extending the useful operating distance of the invention and providing ease of use and portability heretofore unknown in the art. Holder 810 connects in a manner well-known in the art to belt 800 through loop 820. Holder 810 preferably allows any of a plurality of reservoir containers 750 to be rapidly and conveniently interchanged by operator O. Accordingly, holder 810 may be provided with hook-and-loop cooperating fasteners, or other such means well-known in the art, to removably secure reservoir container 750 therewithin. As shown in FIG. 15, a plurality of holder and reservoir combinations may be carried by a single belt 800. Belt 800 also may carry one or more hooks 822 useful for supporting, when not in use, one or more sprayer nozzles 720.

It has been found that separate pressurization of reservoir container 750, as, for example, through a pump and piston arrangement, provides additional fluid pressure useful either for extending spraying distance or for extending the number of vehicles that may be processed. Accordingly, FIGS. 16–17 depict reservoir containers 850, 950 configured in a manner convenient for providing separate pressurization to the reservoir container.

Accordingly, reservoir container 850 is provided with external pump handle 852 connecting to an internal piston arrangement of well-known prior art design. Similarly, reservoir container 950 is provided with external pump handle 952 connecting to an internal piston arrangement of similar and well-known prior art design.

Other pressurization means might include the provision of ancillary air hoses 723 interconnected between cart 710 and reservoir container 850, 950; or, the provision of a compressed gas cylinder to pressurize the reservoir container.

FIG. 17 further demonstrates an alternative embodiment of ancillary cart 760. In this embodiment, ancillary cart 760 is modified to carry an enhanced fluid volume reservoir container 950. Handle 954 is further provided for ease of maneuvering and use of the cart. It will be recognized that features previously discussed with regard to other embodiments of the present invention, such as separate pressurization means, may be utilized in association with this embodiment, and others, of the ancillary cart of the present invention.

Referring now more specifically to FIGS. 18A and 18B, illustrated therein is an alternate embodiment of device 10, wherein the alternate embodiment of FIGS. 18A and 18B is substantially equivalent in form and function to that of the preferred embodiment detailed and illustrated in FIG. 13 except as hereinafter specifically referenced. Specifically, the embodiment of FIG. 18A replaces sprayer nozzle 720 with elongated sprayer nozzle 1000, wherein elongated sprayer nozzle 1000 functions to provide an improved reach, and therefore cleaning, of either the roof or underside of vehicles, and wherein elongated sprayer nozzle 1000 further functions to beneficially distance operator O of device 10 from chemical mists or sprays expelled from elongated sprayer nozzle 1000, thus reducing the likelihood of inhaling same. As best illustrated in FIG. 18B, elongated sprayer nozzle 1000 possesses a substantially elongated tubular-shaped body 1200, wherein body 1200 terminates in downwardly-angled nozzle tip or nose 1202. A foam-sponge padding 1204, or other suitable water/chemical resistant cushioning, envelopes the entirety of body 1200 and nose 1202, thereby providing a cushioned grip for operator O of device 10. Elongated sprayer nozzle 1000 further possesses trigger or actuator 1206, and spray orifice 1208 formed at the end of nose 1202. Fluid line 722 is interconnected to elongated sprayer nozzle 1000 at fitting 1210, positioned proximal to actuator 1206. Air hose 723 is connected at a fitting provided rearward of actuator 1206. Additionally, fluid reservoir 750 incorporates valve 751A for purposes of regulating air pressure therein, and thus, fluid spray force and distance as ejected through elongated sprayer nozzle 1000. Pressure gauge 751B functions in association with valve 751A for purposes of supplying operator O with a visual reading of the amount of air pressure being supplied to fluid reservoir 750. It is further contemplated in an alternate embodiment that elongated sprayer nozzle 1000 could be modified to incorporate features disclosed and illustrated in FIG. 14, thus permitting user-regulation of fluid spray force, type and distance.

Referring now more specifically to FIG. 19, illustrated therein is an alternate embodiment of device 10, wherein the alternate embodiment of FIG. 19 is substantially equivalent in form and function to that of the embodiment detailed and illustrated in FIG. 17 except as hereinafter specifically referenced. Specifically, the embodiment of FIG. 19 incorporates cart 710 and air hose 723 extending therefrom, wherein air hose 723 is connected to an air pressure distributor or manifold 1300 from which branches secondary air hoses 723A, 723B, 723C. Secondary air hoses 723A, 723B, 723C extend into removably sealable communication with mouths 1402, 1502, 1602, respectively, of enhanced fluid volume reservoir containers 1400, 1500, 1600, respectively, for the direct pressurization of the fluid contents contained therein. Secondary air hoses 723A, 723B, 723C possess valves 725A, 725B, 725C, respectively, for purposes of regulating airflow therethrough, and thus, fluid spray force and distance as ejected through elongated sprayer nozzles 1000A, 1000B, 1000C, respectively, wherein elongated sprayer nozzles 1000A, 1000B, 1000C receive fluid from reservoir containers 1400, 1500, 1600, respectively, via fluid lines 722A, 722B, 722C extending respectively therefrom. Pressure gauges 727A, 727B, 727C function in association with valves 725A, 725B, 725C, respectively, for purposes of supplying operator O with a visual reading of the amount of air pressure being supplied to reservoir containers 1400, 1500, 1600, respectively. It is to be understood that elongated sprayer nozzles 1000A, 1000B, 1000C of the present embodiment, as depicted and described herein with reference to FIG. 19, are of equivalent structure and function to that of elongated sprayer nozzle 1000, as depicted and described herein with reference to FIGS. 18A and 18B. Additionally, fluid lines 722A, 722B, 722C of the present embodiment, as depicted and described herein with reference to FIG. 19, are also of equivalent structure and function to that of fluid line 722, as described in the above applicable embodiments.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A portable spray car wash device, comprising:
   (a.) a primary cart, said primary cart further comprising:
      (i.) a plurality of wheels;
      (ii.) a housing, said housing carried by said primary cart;
      (iii.) an operating control;
      (iv.) an air compressing means;
      (v.) a motor electrically interconnected to a power source, said operating control, and said air compressing means; and,
      (vi.) an elongated nozzle, said elongated nozzle interconnected to said air compressing means by a hose; and,
   (b.) an ancillary cart, said ancillary cart further comprising:
      (i.) a plurality of wheels;
      (ii.) a reservoir container;
      (iii.) means for carrying said reservoir container; and,
      (iv.) a fluid line fluidly interconnected between said reservoir container and said elongated nozzle.

2. The portable spray car wash device of claim 1, wherein said power source comprises a battery.

3. The portable spray car wash device of claim 2, wherein said battery is rechargeable through a battery charger and an AC receptacle for conducting power thereto, and wherein said AC receptacle is positioned on said outer surface of said housing.

4. The portable spray car wash device of claim 1, wherein said reservoir container is carried by a belt upon an operator.

5. The portable spray car wash device of claim 1, wherein said reservoir container is pressurized.

6. The portable spray car wash device of claim 5, wherein said reservoir container is pressurized through a pump.

7. The portable spray car wash device of claim 5, wherein said reservoir container is pressurized by compressed air.

8. The portable spray car wash device of claim 1, wherein said means for carrying said reservoir container comprises a shelf.

9. The portable spray car wash device of claim 1, wherein said ancillary cart is vertically adjustable.

10. The portable spray car wash device of claim 1, wherein said ancillary cart comprises co-joined individual support members, separable for ease of transportation and storage.

11. The portable spray car wash device of claim 1, wherein said elongated nozzle comprises a single spray orifice and is enveloped in a padded over-covering.

12. A portable spray car wash device, comprising:
   (a.) a primary cart, said primary cart further comprising:
      (i.) a plurality of wheels;
      (ii.) a housing, said housing carried by said primary cart;
      (iii.) an operating control;
      (iv.) an air compressing means;
      (v.) a motor electrically interconnected to a power source, said operating control, and said air compressing means; and,
      (vi.) a nozzle; and,
   (b.) an ancillary cart, said ancillary cart further comprising:
      (i.) a plurality of wheels;
      (ii.) a reservoir container directly pressurized by said air compressing means via an air hose and a manifold, said manifold adapted to directly pressurize a plurality of reservoir containers;
      (iii.) a shelf for carrying said reservoir container; and,
      (iv.) a fluid line fluidly interconnected between said reservoir container and said nozzle.

13. The portable spray car wash device of claim 12, wherein said power source comprises a battery.

14. The portable spray car wash device of claim 13, wherein said battery is rechargeable through a battery charger and an AC receptacle for conducting power thereto, and wherein said AC receptacle is positioned on said outer surface of said housing.

15. The portable spray car wash device of claim 12, wherein said reservoir container is carried by a belt upon an operator.

16. The portable spray car wash device of claim 12, wherein said ancillary cart is vertically adjustable.

17. The portable spray car wash device of claim 12, wherein said ancillary cart comprises co-joined individual support members, separable for ease of transportation and storage.

18. The portable spray car wash device of claim 12, wherein said nozzle comprises a valve intermediate said nozzle and said fluid line, and wherein said nozzle comprises a single spray orifice.

19. A portable spray car wash device, comprising:
   (a.) a primary cart comprising a plurality of wheels; a housing, said housing carried by said primary cart; an operating control; an air compressing means; a motor electrically interconnected to a power source, said operating control, and said air compressing means; and, an elongated nozzle; and,
   (b.) an ancillary cart comprising a plurality of wheels; a reservoir container carried by said wheels and directly pressurized by said air compressing means via an air hose and a manifold, said manifold adapted to directly pressurize a plurality of reservoir containers; and, a fluid line fluidly interconnected between said reservoir container and said elongated nozzle.

* * * * *